United States Patent Office.

JOHANNES PFLEGER, OF FRANKFORT-ON-THE-MAIN, GERMANY, ASSIGNOR TO DEUTSCHE GOLD & SILBER-SCHEIDE-ANSTALT, VORM. ROESSLER, OF SAME PLACE.

PROCESS OF MAKING DIALKALI CYANAMID.

SPECIFICATION forming part of Letters Patent No. 671,709, dated April 9, 1901.

Application filed December 10, 1900. Serial No. 39,383. (No specimens.)

*To all whom it may concern:*

Be it known that I, JOHANNES PFLEGER, a subject of the Emperor of Germany, and a resident of 215 Gutlentstrasse, Frankfort-on-the-Main, Germany, have invented certain new and useful Improvements in the Manufacture of Cyanamid and Its Compounds, of which the following is a specification.

Cyanamid and its compounds were for a long time a class of bodies which could only be obtained with difficulty. It is only recently that the specifications of Letters Patent granted to Frank and Caro (British Patent No. 25,475, 1898) have disclosed a method which by the action of the nitrogen of the atmosphere on the carbids of the metals of the alkaline earths at a high temperature allows of the obtainment of a mixture containing cyanamid from which aqueous solutions of cyanimid can be obtained.

The present invention consists in a process allowing of the obtainment of cyanamid and its compounds (for instance, the disodium cyanamid) in one operation and in the dry way.

The process is based on the action of sodium amid on sodium cyanid, the hydrogen separating and disodium cyanamid being formed in accordance with the following equation:

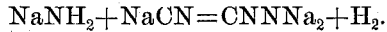

$$\mathrm{NaNH_2 + NaCN = CNNNa_2 + H_2}.$$

Sodium amid melts at a temperature of about 120° centigrade. Sodium cyanid can be introduced into sodium amid heated a little above its point of fusion without a chemical reaction taking place, the cyanid dissolving in the amid without undergoing any change; but if the temperature of the mixture be raised to about 400° centigrade hydrogen is slowly evolved, and it can be shown that cyanamid is present in the molten mass. If the temperature be raised above 400° centigrade, hydrogen is suddenly or somewhat violently disengaged, and if the proportions of the mixture be correct the contents of the crucible consist of almost pure disodium cyanamid. Owing to the great rapidity with which the reaction takes place at about 440° centigrade, the method just described is unsuitable for the preparation of large quantities of cyanamid. The production on a larger scale may be effected by either of two following ways, which I will describe as applied to the production of disodium cyanamid.

First. Amid in the solid or molten state is slowly introduced into molten cyanid. According to the rate at which the amid is introduced the disengagement of the hydrogen will be more or less violent. This gas ignites and burns with a long flame as it issues from the crucible.

Second. The operation is conducted in such a manner that amid in the nascent state is caused to act on the molten cyanid. A weighed quantity of cyanid is melted down and maintained at a temperature little above its point of fusion. Thereupon the calculated quantity of sodium—twenty-three parts of sodium for forty-nine of cyanid of sodium—is brought into the fused mass and ammonia is caused to pass through the mass. The metal is converted by the ammonia into an amid, which at the instant of its production enters into reaction with the cyanid.

In all of the aforesaid reactions the sodium may be entirely or partly replaced by another alkali. Thus with potassium cyanid and potassium amid the dipotassium cyanamid is obtained, while with potassium cyanid and sodium amid the sodium and potassium cyanamid is obtained. The same compound may be obtained with sodium cyanid and potassium amid. From the dialkali cyanamid compounds thus prepared pure cyanamid and its compounds can be obtained in the well-known manner. These may, like the dialkali cyanamid compounds, be used as the first material for the synthesis of other nitrogenous bodies.

I claim—

1. A process of preparation of alkali cyanamid which consists in reacting the amid of the alkali metal with the cyanid of an alkali metal so as to form a dialkali cyanamid in accordance with the following general formula:

$$\mathrm{Alk.NH_2 + Alk.CN = Alk_2NNC + H_2}.$$

2. A process for the preparation of dialkali cyanamid which consists in causing an alkali metal and ammonia to react in the presence of a fused alkali cyanid, alkali amid being formed and reacting in its nascent state upon the alkali cyanid to form dialkali cyanamid, substantially as described.

In testimony whereof I have signed my name to this specification in the presence of two subscribing witnesses.

JOHANNES PFLEGER.

Witnesses:
 JEAN GRUND,
 FRANZ HASSLACHER.